(12) United States Patent
Linke

(10) Patent No.: US 7,673,722 B2
(45) Date of Patent: Mar. 9, 2010

(54) DISC BRAKE FOR A VEHICLE, IN PARTICULAR A COMMERCIAL VEHICLE

(75) Inventor: Tobias Linke, Bad Vilbel (DE)

(73) Assignee: Knorr-Bremse Systeme fuer Nutzfahrzeuge GmbH, Munich (DE)

( * ) Notice: Subject to any disclaimer, the term of this patent is extended or adjusted under 35 U.S.C. 154(b) by 834 days.

(21) Appl. No.: 10/546,706

(22) PCT Filed: Feb. 20, 2004

(86) PCT No.: PCT/EP2004/001668

§ 371 (c)(1),
(2), (4) Date: Jun. 26, 2006

(87) PCT Pub. No.: WO2004/074705

PCT Pub. Date: Sep. 2, 2004

(65) Prior Publication Data

US 2007/0023239 A1 Feb. 1, 2007

(30) Foreign Application Priority Data

Feb. 24, 2003 (DE) ................................. 103 07 734

(51) Int. Cl.
*F16D 55/16* (2006.01)
(52) U.S. Cl. .................... 188/72.9; 188/72.6; 188/72.7; 188/72.1
(58) Field of Classification Search ................ 188/72.9, 188/72.6, 72.7, 71.7, 71.8, 71.9, 72.1
See application file for complete search history.

(56) References Cited

U.S. PATENT DOCUMENTS

| | | | | |
|---|---|---|---|---|
| 3,741,350 | A | | 6/1973 | Knapp |
| 5,515,949 | A | * | 5/1996 | Baumgartner et al. ...... 188/72.9 |
| 5,547,048 | A | * | 8/1996 | Anthony ..................... 188/72.9 |
| 5,568,845 | A | * | 10/1996 | Baumgartner et al. ...... 188/71.9 |
| 5,582,273 | A | * | 12/1996 | Baumgartner et al. ...... 188/72.6 |
| 5,819,884 | A | * | 10/1998 | Giering ..................... 188/71.9 |
| 5,833,035 | A | * | 11/1998 | Severinsson ............... 188/72.7 |
| 6,311,809 | B1 | | 11/2001 | Thomas et al. |
| 6,336,686 | B2 | * | 1/2002 | Thomas et al. .................. 303/2 |
| 6,435,319 | B1 | * | 8/2002 | Thomas et al. ............. 188/72.1 |

(Continued)

FOREIGN PATENT DOCUMENTS

DE 20 57 322 5/1972

(Continued)

*Primary Examiner*—Robert A Siconolfi
*Assistant Examiner*—Mariano Sy
(74) *Attorney, Agent, or Firm*—Crowell & Moring LLP

(57) ABSTRACT

A disk brake for a vehicle, in particular a commercial vehicle, including an application device, which is used to apply a brake lining to a brake disk by at least one or two actuating spindles running parallel and at a distance from one another in a bridge. The application device has an anti-friction roller, which is supported on a pivotable lever of the application device. The disk brake is configured in such a way that the anti-friction roller is fixed as a separate component radially and axially on the lever and is held by an anti-friction roller holder that is fixed to the lever. The anti-friction roller holder is provided with cage return guides, which, when the lever is pivoted back into an initial position, likewise press the journal bearings into an initial position.

6 Claims, 3 Drawing Sheets

U.S. PATENT DOCUMENTS 6,736,244 B2 * 5/2004 Baumgartner et al. ...... 188/72.7
6,955,246 B2 * 10/2005 Norman et al. ............ 188/71.8

FOREIGN PATENT DOCUMENTS

| DE | 196 38 899 A1 | 3/1998 |
| WO | WO 95/19511 | 7/1995 |
| WO | WO 96/36819 | 11/1996 |

* cited by examiner

DISC BRAKE FOR A VEHICLE, IN PARTICULAR A COMMERCIAL VEHICLE

BACKGROUND AND SUMMARY OF THE INVENTION

The present invention relates to a disk brake for a vehicle, in particular a commercial vehicle, having a brake application device which is arranged in a brake caliper and by way of which a brake lining can be pressed against a brake disk during braking via at least one or two control spindles which are arranged in a bridge in parallel and at a distance from one another.

The brake application device has a cylindrical roller, which is in contact with a rotary lever of the brake application device, which lever is configured as an eccentric in the supporting region with rotary bearings of the brake caliper. The cylindrical roller is fastened in an axially and radially secured manner as a separate component, and the cylindrical roller is held by a cylindrical roller holder which is fastened to the lever.

In a disk brake of the above type, which can preferably be actuated by compressed air or electronically and can be installed, in particular, in commercial vehicles, the brake application device includes the rotary lever, a bearing shell which is connected to the lever, and the cylindrical roller, which extends parallel to the brake disk and forms a pivot axis for the lever. The cylindrical roller lies in the bearing shell.

For the axial and radial fixing of the cylindrical roller, it is known to provide bearing lugs on the bridge, which are usually formed from sheet metal and in which the cylindrical roller is held. Together with a correspondingly shaped contact face, the bearing shell, which is riveted to the lever and is likewise composed of sheet metal, forms the bearing for the cylindrical roller.

However, disadvantages result, in particular during assembly. The assembly proves to be complicated and, therefore, counterproductive to economic and inexpensive manufacturing.

As assemblies are preinstalled, which are joined together during final assembly, every assembly which is to be manufactured separately is associated with corresponding manufacturing expenditures together with the costs which result from that.

The known disk brake also leaves something to be desired in functional terms, as exact positioning of the cylindrical roller with respect to the lever by the fastening of the cylindrical roller to the bridge is not ensured.

A disk brake of the above type is known from U.S. Pat. No. 6,311,809 B1, in which the lever is supported on rotational bearings, which are in contact with the brake caliper. As the brake actuation increases, there is the risk that the rotational bearings, which are configured as needle bearings, are guided out of their contact region, with the result that the functionality is at least restricted.

The present invention is, therefore, based on the object of developing a disk brake of the generic type in such a way that it can be manufactured more inexpensively while improving its function.

This object is achieved by providing a disk brake having a brake application device which is arranged in a brake caliper and by way of which a brake lining can be pressed against a brake disk during braking via at least one or two control spindles which are arranged in a bridge in parallel and at a distance from one another.

The brake application device has a cylindrical roller, which is in contact with a rotary lever of the brake application device, which lever is configured as an eccentric in the supporting region with rotary bearings of the brake caliper. The cylindrical roller is fastened in an axially and radially secured manner as a separate component, and the cylindrical roller is held by a cylindrical roller holder which is fastened to the lever.

The cylindrical roller holder is provided with cage return guides, by way of which, when the rotary lever pivots back into an initial position, the rotational bearings can likewise be pressed back into an initial position.

As a result of this structural configuration of a disk brake, the lever assembly can be preinstalled as a complete unit, while there is then no more installation work to be performed in this sense on other components, for example the bridge assembly. This naturally results in manufacturing advantages, because it is possible to dispense completely with installation processing of the bridge.

The invention is of particular significance, in particular, in view of disk brakes of this type being manufactured in great numbers.

This applies equally to final installation, in which the disk brakes are assembled. Here too, there is a simplification in the work sequence with the consequence of an appreciable reduction in costs.

The functionality of the disk brake is also improved by the refinement according to the invention, as it is possible to position the cylindrical roller very precisely with respect to the lever. As a result, tolerance-induced actuating problems of the brake application device are avoided overall and, as a result of which, the functional reliability of the disk brake is increased.

According to one advantageous aspect of the invention, there is provision for, in each case, one bearing lug to be provided at the end, preferably at both ends, of the bearing shell, which is riveted to the lever. A bearing journal, which is attached concentrically at the respective end of the cylindrical roller, lies in said bearing lug.

The bearing shell is usually formed from sheet metal, preferably as a punched part, with the result that it is possible to attach the bearing lugs without additional manufacturing expenditure, that is to say the bearing lugs can also be formed during punching of the bearing shell.

Particularly simple assembly results if, in order to fasten the cylindrical roller to the lever, a separate cylindrical roller holder is provided which holds the cylindrical roller in the region of the bearing journals on the side which lies opposite the bearing shell. The cylindrical roller holder is, moreover, connected fixedly to the lever, for example by riveting.

The cylindrical roller holder can be configured such that it at the same time assumes the function of the return guide for rotational bearing cages. The rotatable lever is mounted on a brake caliper using the rotational bearing cages.

In the case where, given an appropriate design of the disk brake, rotational bearings are used, a single component may be used as the return guide for the cages and to hold the cylindrical roller. The single component can both be manufactured as a simple punched sheet metal part and can also be assembled with little expenditure.

Further advantageous configurations of the invention are described and claimed herein.

BRIEF DESCRIPTION OF THE DRAWINGS

One exemplary embodiment of the invention will be described in greater detail in the following text using the appended drawings, in which.

DETAILED DESCRIPTION OF THE DRAWINGS

Figure 1:
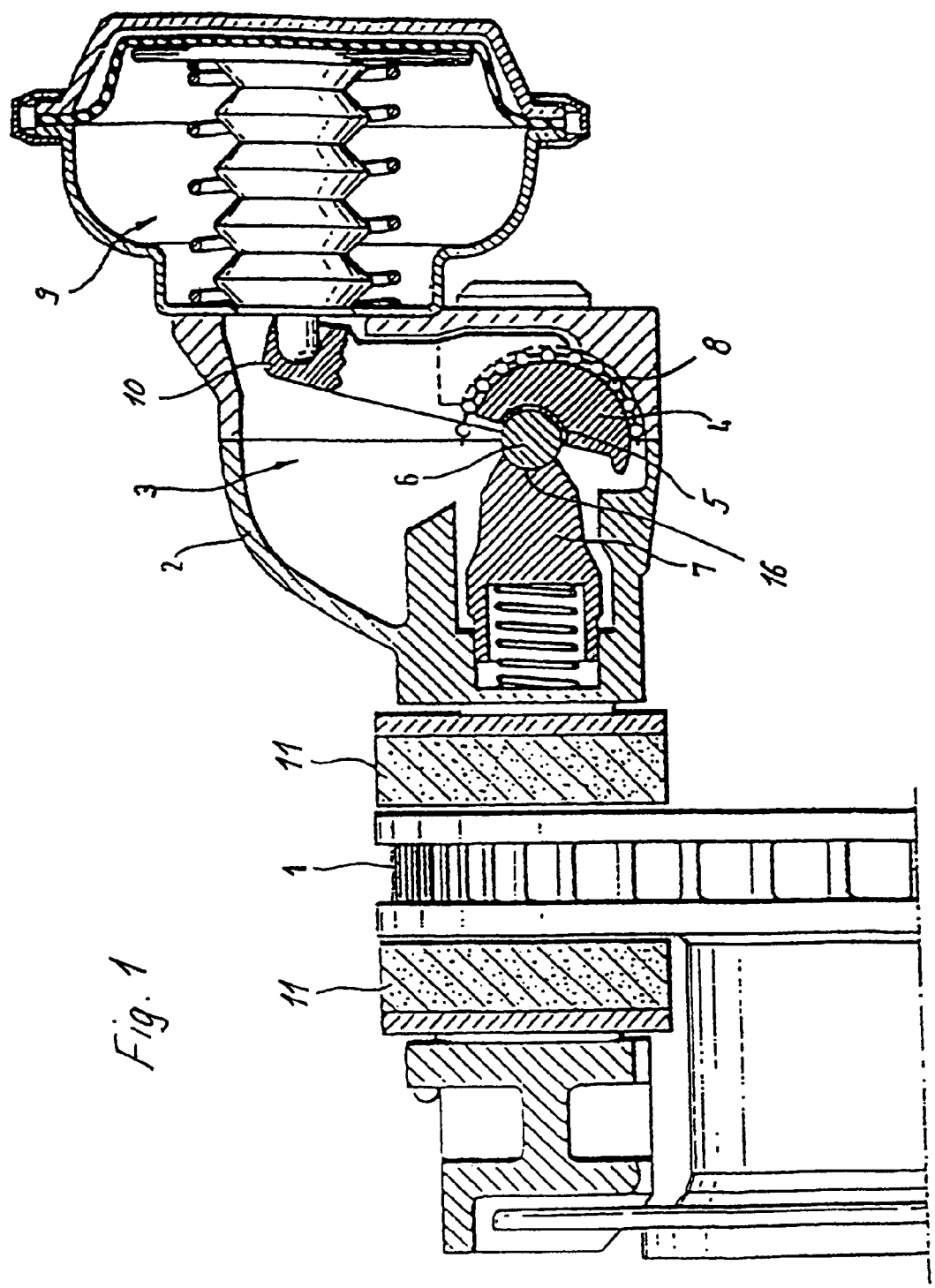
FIG. 1 shows the diagrammatic construction of a disk brake according to the invention, in a cross section.

FIG. 1 shows a diagrammatic cross-section illustration of a disk brake for a vehicle, in particular a commercial vehicle, which has a brake disk 1 which is fastened to an axle (not shown) of the commercial vehicle and is surrounded by a brake caliper 2 which can be displaced in the direction of the brake disk 1.

A brake application device 3 is arranged in the brake caliper 2, it being possible to press brake linings 11 against the brake disk 1 with the brake application device 3 in the event of braking, which is initiated via a brake cylinder 9, which is preferably actuated pneumatically.

For this purpose, the brake application device 3 acts on two control spindles (not shown), which are arranged in a bridge 7 in parallel and at a distance from one another.

Figure 2:
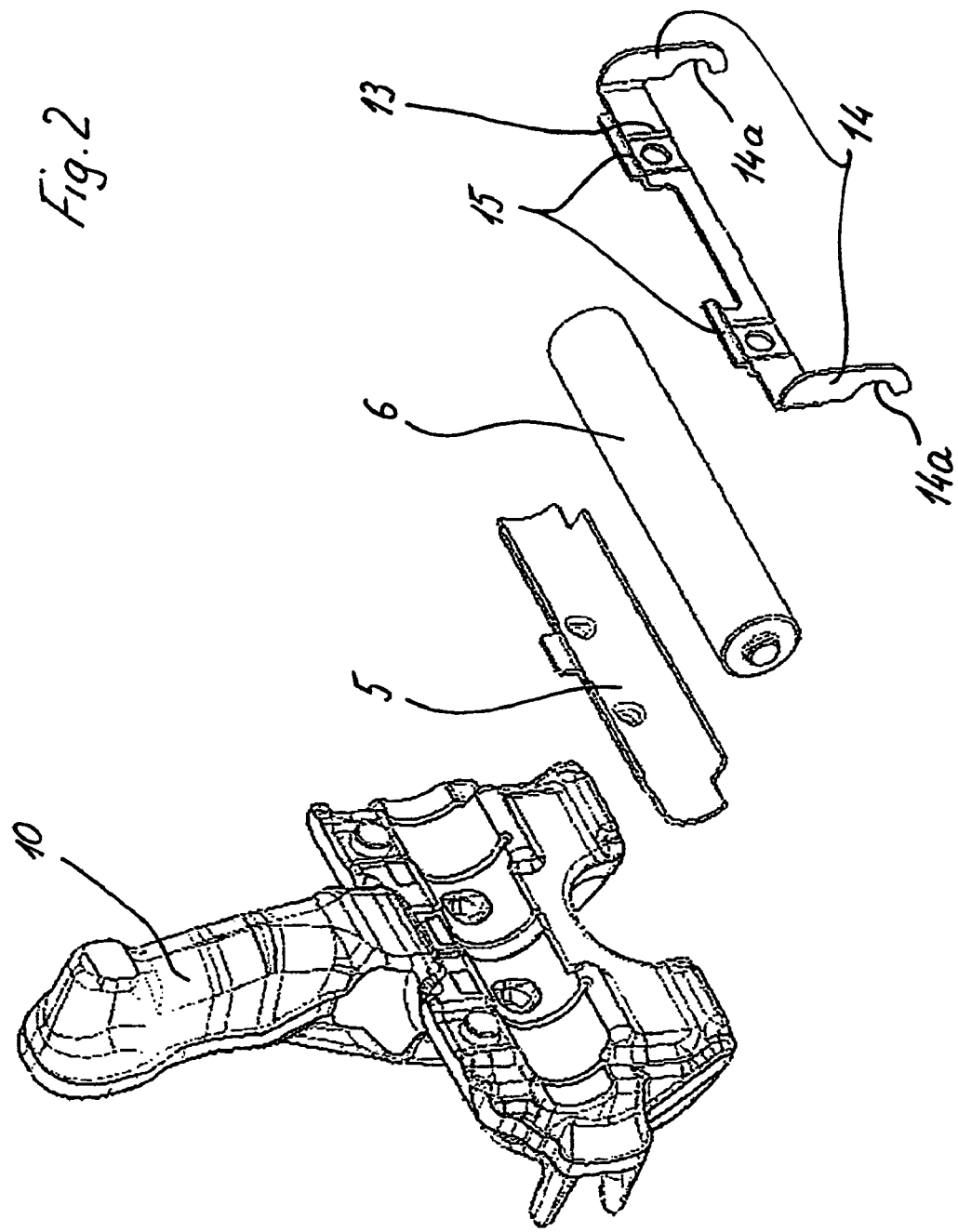
FIG. 2 shows a brake application device of the disk brake, in an exploded diagram.
Figure 3:
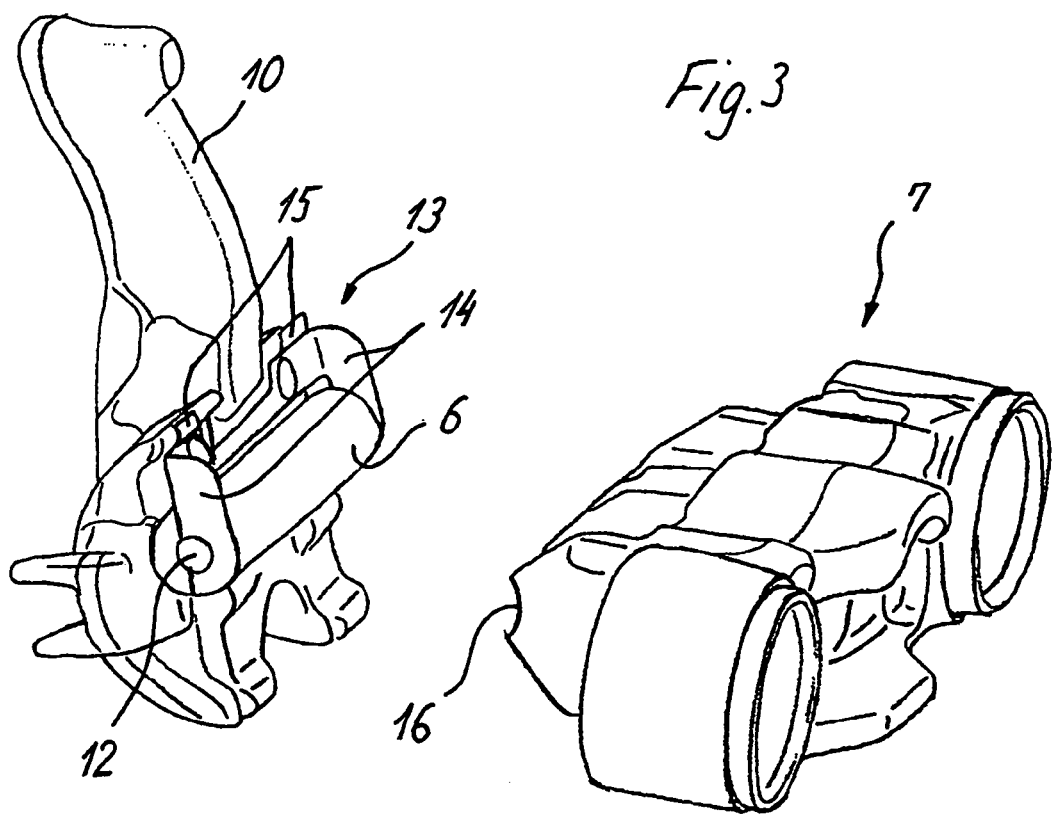
FIG. 3 shows assemblies of the disk brake, which are partially completely installed, likewise in an exploded diagram.
Figure 4:
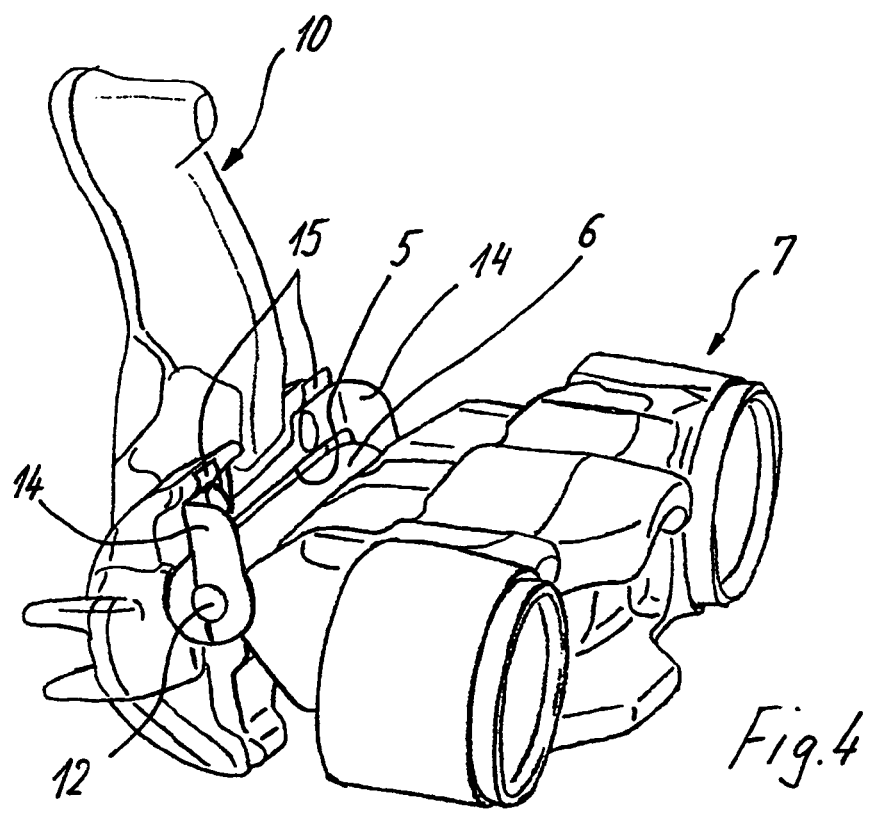
FIG. 4 shows the assemblies according to FIG. 3 in an installed position, in a perspective view.

The brake application device 3 can also be seen very clearly, in particular, in FIGS. 2 to 4. It can be seen that it has a lever 10 which is operatively connected to the brake cylinder 9 and, when the brake cylinder 9 is actuated in the direction of the brake disk 1, can be pivoted about a cylindrical roller 6, which extends parallel to the plane of the brake disk 1.

A rotational bearing 8 is provided in the brake caliper 2. The lever 10, which is configured in this region as an eccentric 4, is supported on the rotational bearing 8.

According to the invention, the cylindrical roller 6 is fastened to the lever 10 in an axially and radially secured manner as a separate component.

Here, a bearing shell 5, which engages around the cylindrical roller 6 in regions is connected fixedly to the lever 10, while the cylindrical roller 6 is supported for its part on a receptacle 16 of the bridge 7, which is adapted to its contour. This results in that the receptacle 16 and the bearing shell 5 form a bearing together with the cylindrical roller 6.

A cylindrical roller holder 13, which extends over the length of the cylindrical roller 6 and is connected fixedly to the lever 10, is provided for fastening the cylindrical roller 6 to the lever 10.

The cylindrical roller holder 13 has angled away bearing lugs 14 at both ends, which bearing lugs 14 are provided with recesses 14a in which, in each case, one bearing journal 12 of the cylindrical roller 6 lies. The bearing lugs 14 engage around the bearing journals 12 on the side of the bearing journals opposite the bearing shell 5.

As, in particular, FIG. 2 shows very clearly, the cylindrical roller holder 13 is provided with cage return guides 15, which are provided in the form of webs and by way of which, when the lever 10 pivots back into an initial position, the rotational bearings 8 are likewise pressed into an initial position.

TABLE OF REFERENCE NUMBERS

1 brake disk
2 brake caliper
3 brake application device
4 eccentric
5 bearing shell
6 cylindrical roller
7 bridge
8 rotational bearing
9 brake cylinder
10 lever
11 brake linings
12 bearing journals
13 cylindrical roller holder
14 bearing lugs
14a recesses
15 cage return guides

The invention claimed is:

1. A disk brake for a commercial vehicle, comprising:
    a caliper;
    a brake application device arranged in the caliper by way of which a brake lining is pressed against a brake disk during braking via a bridge;
    wherein the brake application device includes a rotary lever configured as an eccentric in a supporting region having rotational bearings on the caliper, the brake application device further including a cylindrical roller fastened in an axially and radially secured manner as a separate component on the rotary lever, the cylindrical roller being secured via a cylindrical roller holder fastened to the lever;
    wherein the cylindrical roller holder includes cage return guides, by way of which, when the rotary lever pivots back into an initial operating position, the rotational bearings are pressed back into their initial position;
    wherein the cylindrical roller holder has, in each case, one bearing lug at both ends, by way of which bearing lugs the cylindrical roller is mounted; and
    wherein the bearing lugs have, in each case, one recess which engages around bearing journals of the cylindrical roller on a side of the bearing journals which lies opposite the lever.

2. The disk brake according to claim 1, wherein the cylindrical roller holder extends over an entire length of the cylindrical roller.

3. The disk brake as claimed in claim 1, wherein the cage return guides are configured as webs.

4. The disk brake as claimed in claim 1, wherein the cage return guides and the cylindrical roller holder are of a one-piece configuration.

5. The disk brake as claimed in claim 1, wherein the cage return guides and the cylindrical roller holder are configured as a punched sheet metal part.

6. An assembly for a brake application device used in a disk brake, the assembly comprising:
    a rotary lever adapted at one end to be operated upon by a brake cylinder, the other end of the rotary lever forming an eccentric, supportable via rotational bearings on a caliper, to selectively displace a bridge of the brake application device to effect braking;
    a separate cylindrical roller;
    a cylindrical roller holder fastened to the lever in an area of the eccentric, the cylindrical roller holder securing the separate cylindrical roller in an axially and radially secured manner on the lever, wherein the separate cylindrical roller is held so as to be parallel to a brake disk when in use;
    wherein the cylindrical roller holder includes cage return guides which are configured to operate upon the rotational bearings so as to return the rotational bearings to an initial position upon pivoting the rotary lever back to an initial rotary lever position when in use;

wherein the cylindrical roller holder has a longitudinal length extending over an entire length of the separate cylindrical roller;

wherein a bearing lug is provided at each longitudinal end of the cylindrical roller holder, the bearing lugs being configured to mount the separate cylindrical roller; and wherein the bearing lugs include a recess adapted to engage around bearing journals formed, respectively, at longitudinal ends of the separate cylindrical roller, the recess being configured to engage the bearing journals on a side opposite the rotary lever.

* * * * *